(12) United States Patent  
Tevs et al.

(10) Patent No.: US 7,498,973 B2  
(45) Date of Patent: Mar. 3, 2009

(54) RADAR FOR GROUND SPEED MEASUREMENT

(75) Inventors: Nikolai Tevs, Winnipeg (CA); David George Sokol, Winnipeg (CA); Tomasz Jonca, Winnipeg (CA); Nelson Yung, Winnipeg (CA); Paulo Rodrigues, Winnipeg (CA)

(73) Assignee: Vansco Electronics LP, Winnipeg, Manitoba (CA)

( * ) Notice: Subject to any disclaimer, the term of this patent is extended or adjusted under 35 U.S.C. 154(b) by 341 days.

(21) Appl. No.: 11/349,552

(22) Filed: Feb. 8, 2006

(65) Prior Publication Data

US 2006/0267831 A1    Nov. 30, 2006

Related U.S. Application Data

(63) Continuation-in-part of application No. 10/703,089, filed on Nov. 7, 2003, now abandoned.

(51) Int. Cl.
G01S 13/93    (2006.01)
(52) U.S. Cl. .......................................... 342/104; 342/70
(58) Field of Classification Search ................... 342/70, 342/104, 165, 175; 361/818
See application file for complete search history.

(56) References Cited

U.S. PATENT DOCUMENTS

| 5,302,956 | A | 4/1994 | Asbury et al. |
| 5,835,850 | A | 11/1998 | Kumar |
| 6,127,965 | A | 10/2000 | McDade et al. |
| 6,639,547 | B2 | 10/2003 | Solbach |
| 6,952,564 | B2 | 10/2005 | Gannholm |
| 2004/0079152 | A1* | 4/2004 | Sorenson et al. .............. 73/313 |
| 2005/0013126 | A1* | 1/2005 | Hwang ........................ 361/818 |

* cited by examiner

*Primary Examiner*—Ian J Lobo  
(74) *Attorney, Agent, or Firm*—Adrian D. Battison; Ade & Company Inc.

(57)    ABSTRACT

A radar transducer has a planar array antenna mounted on a plate portion of a housing with the microwave transceiver mounted on the opposite side of the plate and carrying a PCB defining the processing section for supplying an output to a cable. The plate portion slides into a plastic receptacle defining the radome for the antenna with a potting compound sealing the open face of the receptacle. The electrical processing section is shielded from extraneous electromagnetic waves without additional metallic shielding elements. The processor is programmable in response to signals received through the output cable so as to re-configure the program thereof so as to change the output to the output cable for different end use controllers and for compatibility with communications protocols. The processor is programmed to carry out a test of the operation of the transceiver and to provide a failure output signal to the cable in the event that the operation is found to be outside predetermined parameters.

13 Claims, 5 Drawing Sheets

United States Patent US 7,498,973 B2

RADAR FOR GROUND SPEED MEASUREMENT

This application is a Continuation-in-Part application from application Ser. No. 10/703,089 filed Nov. 7, 2003 now abandoned.

This invention relates to a radar transducer for transmitting electromagnetic waves at a predetermined frequency, for receiving the reflected signals at a frequency Doppler shifted by motion and for providing an output indicative of the amount of shift caused by the motion. Such a transducer is preferably and primarily used for measuring ground speed of an object to which the transducer is attached but can also be used for detecting other motions.

BACKGROUND OF THE INVENTION

Radar transducers of this general type are widely used for many purposes but one particular end use is that on vehicles for detecting vehicle speed. The transducer forms part of the vehicle control system and thus communicates with the vehicle control system by providing suitable output signals at a number of leads of an output cable. The output signals are not standardized so that different end uses or vehicles often require different output signals to be provided by the transducer. Such transducers are often relatively complicated in manufacture due to the requirement for metallic shielding to avoid interference of the output signals from extraneous electro magnetic radiations.

SUMMARY OF THE INVENTION

It is one object of the present invention therefore to provide an improved radar transducer.

According to one aspect of the invention there is provided a radar transducer comprising:

an antenna for transmitting electromagnetic waves at a predetermined frequency and for receiving reflected waves at a second frequency Doppler shifted from the predetermined frequency;

a microwave transceiver for supplying to and receiving from the antenna the electromagnetic waves and detecting a Doppler frequency;

an output cable;

an electrical processing section mounted on a circuit board for processing the Doppler frequency and for communicating with the output cable;

and a housing for containing the antenna, the microwave transceiver and the electrical processing section and for receiving and locating an inner end of the output cable;

wherein the microwave transceiver is shielded by a metallic shield surrounding the microwave transceiver leaving the electrical processing section exposed outside the metallic shield;

and wherein the electrical processing section is substantially without metallic shielding elements.

Preferably the metallic shield includes at least a portion which has perforations therein and wherein the housing contains a potting material which extends through the perforations into a hollow interior of the metallic shield to locate and support the microwave transceiver from vibration.

Preferably the housing comprises a mounting element providing mountings thereon for the antenna, the microwave transceiver, the electrical processing section and an inner end of the cable, a receptacle element having an open end face, into which the mounting element carrying the antenna, the microwave transceiver, the electrical processing section and an inner end of the cable are inserted as a common assembly, and a potting compound closing the open end face and enclosing the mounting element, the antenna, the microwave transceiver, the electrical processing section and an inner end of the cable within the receptacle.

Preferably the mounting element includes a plate portion on which the antenna is mounted as a planar array.

Preferably the plate portion has a part of the metallic shield attached thereto forming one side of the metallic shield and wherein a further part of the metallic shield is separate from the plate portion and is attached thereto.

Preferably one open side of the metallic shield is attached to the circuit board carrying the electrical processing section which extends at right angles to the plate portion.

Preferably the plate portion on which the antenna is mounted as a planar array has a peripheral sealing member for engaging a sealing surface of the receptacle element so prevent the entry of the potting compound into the area between the plate portion and the sealing surface and wherein the sealing surface is arranged substantially at right angles to the open mouth such that the plate portion slides into the receptacle element in a direction substantially parallel to the plate portion and to the sealing surface.

Preferably the microwave transceiver and the electrical processing section are mounted on a rear of the plate portion opposite to the antenna array.

Preferably the microwave transceiver and the electrical processing section are arranged to have a high immunity to extraneous electromagnetic waves by arranging the power supply such that a 5V voltage regulator powers the analogue section directly and the processor through a pi-RC filter.

Preferably the microwave transceiver and the electrical processing section are arranged to have a high immunity to extraneous electromagnetic waves by providing a power supply conductor and a ground return conductor as parallel plates on a printed circuit board on which the electrical processing section is mounted.

According to a second aspect of the invention there is provided a radar transducer comprising:

an antenna for transmitting electromagnetic waves at a predetermined frequency and for receiving reflected waves at a second frequency Doppler shifted from the predetermined frequency;

a microwave transceiver for supplying to and receiving from the antenna the electromagnetic waves and detecting a Doppler frequency;

an output cable;

an electrical processing section mounted on a circuit board for processing the Doppler frequency and for communicating with the output cable;

and a housing for containing the antenna, the microwave transceiver and the electrical processing section and for receiving and locating an inner end of the output cable;

wherein the microwave transceiver is shielded by a metallic shield surrounding the microwave transceiver;

wherein the metallic shield includes at least a portion which has perforations therein;

and wherein the housing contains a potting material which extends through the perforations into a hollow interior of the metallic shield to locate and support the microwave transceiver from vibration.

According to a third aspect of the invention there is provided a radar transducer comprising:

an antenna for transmitting electromagnetic waves at a predetermined frequency and for receiving reflected waves at a second frequency Doppler shifted from the predetermined frequency;

a microwave transceiver for supplying to and receiving from the antenna the electromagnetic waves and detecting a Doppler frequency;

an output cable providing four separate leads arranged for connection of the first lead to power, the second lead to a signal output, the third lead to a radar present signal and the fourth lead to ground;

an electrical processing section for processing the Doppler frequency and for communicating with the second and third leads of the output cable;

and a housing for containing the antenna, the microwave transceiver and the electrical processing section and for receiving and locating an inner end of the output cable;

wherein the processor is arranged to be programmable in response to signals received through the second lead of the output cable so as to re-configure the program thereof so as to change the output to the second lead of the output cable which is generated in response to specific reflected waves.

Preferably the output to the output cable comprises a series of pulses at a frequency which is related to the Doppler frequency from the microwave transceiver and wherein the processor is arranged to be programmable in response to signals received through the output cable so as to re-configure the program thereof so as to change one or more of:

an offset value of the output signals;

a scaling factor of the output signals;

a polarity of the of the output signals;

and a transducer response time by changing acquisition and processing time for the Doppler signals.

Original equipment manufacturers operate in very competitive environment and design their unique systems to achieve market advantages. Very often they need a sensor similar to existing one but with specific changes or properties. To serve them a component manufacturer had to build countless versions of the same product, maintain inventories and support them. In the radar instance only polarity of signals on two output leads ("signal" and "radar present") creates four radar types that are not compatible. Radar vibration immunity and response time are contradicting requirements that are usually optimized for a particular system and determined by a signal-processing algorithm. A Doppler frequency-scaling factor and an offset frequency are another variables that reside in software.

The proposed radar has a flash-based microcontroller that is programmed only with boot-loader at the factory. At a distributor facility or at a service depot the radar is programmed with a software version that is required by the customer application. To program the unit voltage on the power lead has to be increased to 28 volts for short period of time and then lowered to 12 volts. Now the controller monitors the signal line and communicates with a computer that uploads the application software. If the particular radar unit has to be moved to a different system the re-configuration process has to be repeated.

According to a fourth aspect of the invention there is provided a radar transducer comprising:

an antenna for transmitting electromagnetic waves at a predetermined frequency and for receiving reflected waves at a second frequency Doppler shifted from the predetermined frequency;

a microwave transceiver for supplying to and receiving from the antenna the electromagnetic waves and detecting a Doppler frequency;

an output cable;

an electrical processing section for processing the Doppler frequency and for communicating with the output cable;

and a housing for containing the antenna, the microwave transceiver and the electrical processing section and for receiving and locating an inner end of the output cable;

wherein the housing comprises a mounting element providing mountings thereon for the antenna, the microwave transceiver, the electrical processing section and an inner end of the cable as a common assembly;

a receptacle element having an open end face into which the mounting element carrying the antenna, the microwave transceiver, the electrical processing section and an inner end of the cable is inserted as a common assembly;

and a potting compound closing the open end face and enclosing the mounting element, the antenna, the microwave transceiver, the electrical processing section and an inner end of the cable within the receptacle.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION OF PREFERRED EMBODIMENTS

Figure 2:
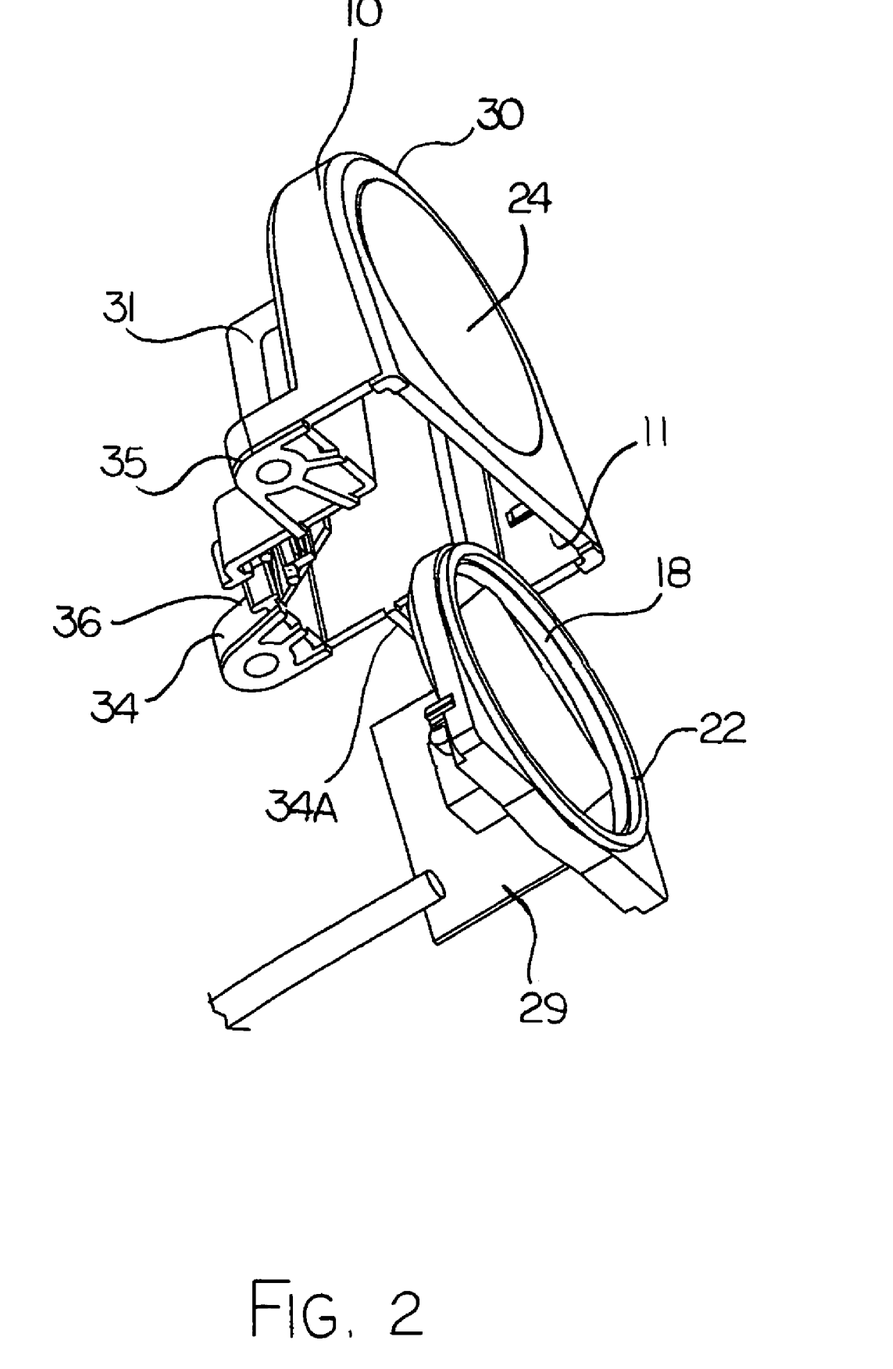
FIG. 2 is an isometric exploded view of the antenna, transceiver, electrical components and housing forming the construction of the transducer of FIG. 1.
Figure 3:
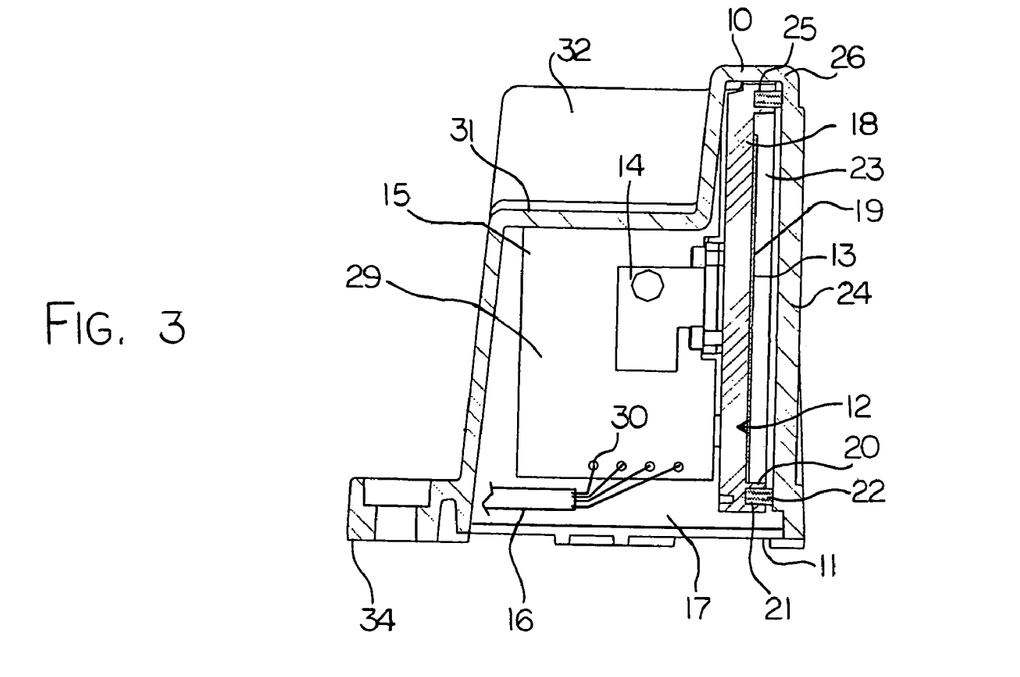
FIG. 3 is a cross sectional view of the components of FIG. 2 at right angles to the planar antenna.
Figure 4:
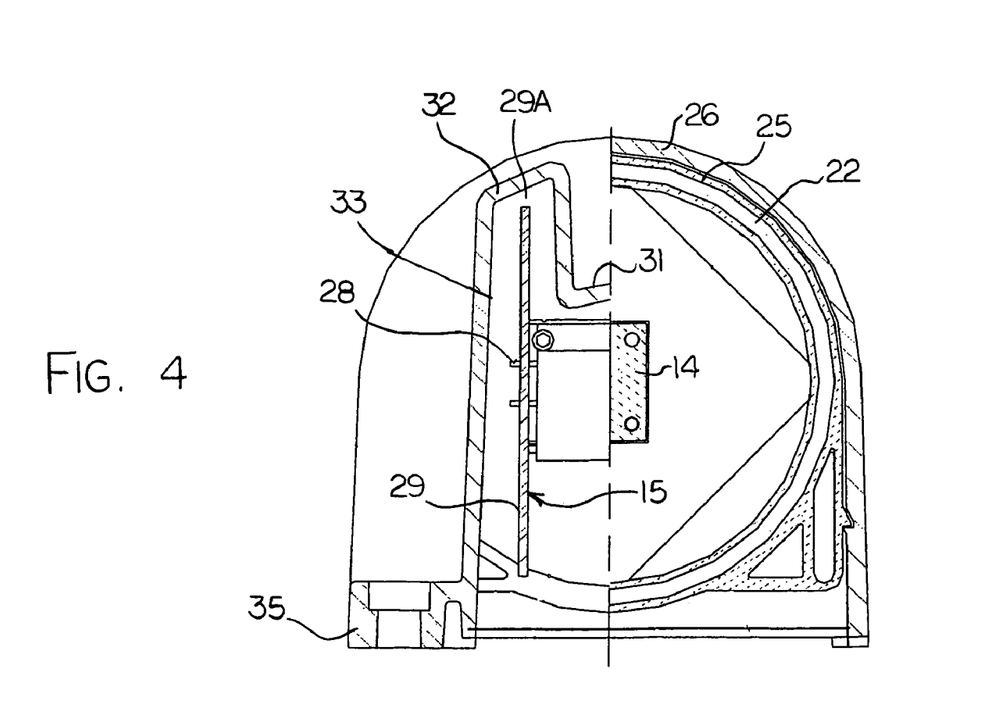
FIG. 4 is a cross sectional view of the components of FIG. 2 parallel to the planar antenna.

The physical structure of the transducer is shown in FIGS. 2, 3 and 4 and comprises an exterior housing 10 defining a receptacle with an open end face 11. Within the receptacle portion of the housing is provided a mounting assembly 12 for supporting a planar array antenna 13, a microwave transceiver 14, an electrical processing section 15 and a cable 16. The mounting element 12 can be inserted into the open face 11 of the receptacle section and held in place by a potting compound 17 enclosing the mounting element and closing the end face 11 of the receptacle sections.

The mounting portion 12 includes a generally plate shaped portion 18 with a flat front face 19 defining a support for the planar antenna array 13. A lip 20 surrounds the face 19 and forms a channel shaped receptacle 21 for an O ring seal 22. The receptacle portion 10 includes a generally flat circular radome facing the surface 19 carrying the antenna 13. This defines a space 23 between the inside surface of the radome 24 and the antenna. The disc and the radome are parallel and both lie at right angles to the open face 11 so that the disc can be inserted into the open face sliding along the inside surface of the radome 24 until an outermost edge of the disc indicated at 25 butts a peripheral wall 26 of the receptacle 10.

The O ring seal 22 contacts the inside surface of the housing 10 at an area surrounding the radome 24 so as to provide a seal closing off the area 23 from the remainder of the interior of the housing and allowing the remainder of the interior of the housing to be filled with the potting compound 17 without the potting compound penetrating into the area 23 and interfering with the antenna array. The antenna array is etched on the surface of a microwave PCB that is glued to the surface 19 within the area defined by the lip 20.

The transceiver 14 is also of a commercially available type which contains a Gunn diode which generates the predetermined microwave wave form for communication to the antenna and transmission by the antenna through the radome. The transceiver further includes a Schottky diode which acts to mix the predetermined microwave frequency and the reflected frequency and to detect the Doppler output frequency dependent upon the Doppler shift. The transceiver is also commercially available item and widely used in radar devices of this type. The antenna and transceiver are commercially available from Dorado International, MACOM and MDT.

The transceiver is in a form of a generally rectangular container formed of metal which is screw fastened to an antenna connector on the ground plane of the antenna PCB so that the connector protrudes through the disc shaped portion 12 and delivers microwave signals to and from the antenna on the opposite surface facing the radome. The transceiver has a plurality of mounting pins 28 on one side so that the pins are parallel to the rear surface of the disc shaped portion 12 so that they stand out at right angles from the surface of the transceiver which itself stands at right angles to the disc shaped portion 12. The pins 28 carry the electrical components 15 which are mounted on a printed circuit board 29. Thus the printed circuit board 29 forms a planar structure at right angles to the rear surface of the disc shaped portion 12 and standing outwardly therefrom. The cable 16 includes a plurality of connectors 30 which are fastened onto the PCB 29 at suitable connection points thereon. The cable includes four wires which are conventionally designated as power, ground, radar present and signal respectively.

The housing is shaped to receive the four components defined by the disc 12 carrying the antenna, the transceiver 14, the PCB 29 and the cable 16. Thus the housing 10 as best shown in FIG. 2 has a flat open end face 11 which is shaped so the whole of the mounting portion including the above four components can be inserted into the open face. The housing then includes a generally dome shaped portion 24A defining at its front face the radome 24 and closely surrounding the periphery of the disc shaped portion 12. At the rear of the dome shaped portion 24A is provided a generally rectangular receptacle section 31 which receives the transceiver 14. A further receptacle portion 32 is shaped to receive the PCB 29 which projects outwardly from the rear of the disc portion 12. The PCB 29 has a height substantially equal to the diameter of the disc shaped portion so that the edge 29A of the PCB extends into a slot shaped section 33 of the housing portion 32. The housing portion 32 connects with the portion 31 at the centre section of the PCB which is connected to the transceiver 14.

The base of the housing 10 at the open face 11 is shaped to define three screw receptacles 34, 34A and 35 so that the flat open face can be screw fastened onto a suitable mounting component of the vehicle or other element to which it is attached. Thus the end face butts against a suitable surface on the vehicle. The potting compound 17 fills the housing within all sections with the exception of the area 23 up to the plane of the end face 11. The housing at the end face also includes a gland 36 through which the cable passes so as to be held in place at the edge of the housing just inside the end face 11 with the cable being maintained in position by the potting compound within which the end of the cable and the connectors 30 are buried.

The plate portion forming the disc and also the housing 10 forming the receptacle are both molded from a suitable plastics material and contain no metallic shielding elements for shielding the electrical components from electromagnetic radiation surrounding the housing.

The manufacture of the device can be effected easily and cheaply due to the fact that the components are firstly mounted on the exposed mounting portion defined by the disc so that all components are accessible for testing after the mounting is complete. The components on the mounting portion can then be inserted into the receptacle portion as a simple sliding fit all in one piece including the cable and the manufacture finished by application of the potting compound in conventional manner.

Figure 1:
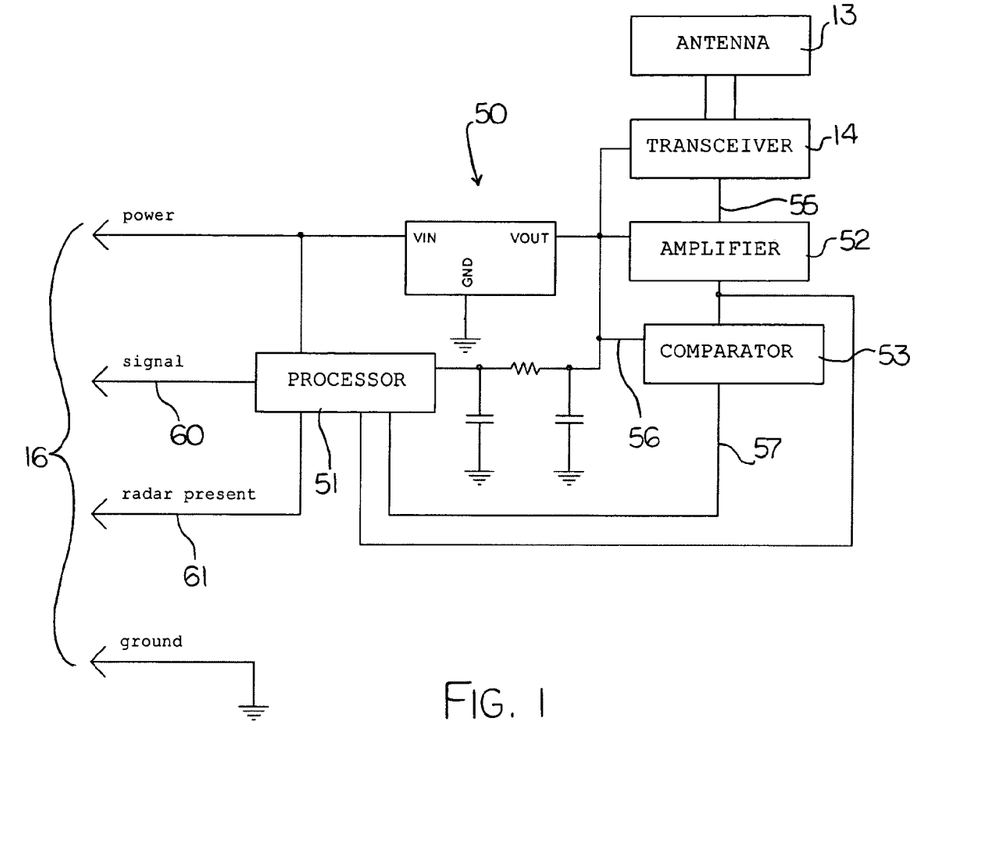
FIG. 1 shows a block diagram of the transducer.

Turning now to the operating components shown in FIG. 1, the components include the antenna 13, the transceiver 14 and the cable 16. The further electrical components which are defined and mounted on the PCB 29 comprise a power supply 50, a digital processing section and control unit defined by a processor 51 and an analogue section defined by an amplifier 52 and the comparator 53.

In general the device operates by the transceiver generating the required microwave wave form which is transmitted to the antenna 13 and the Doppler shifted signal is received by the transceiver through the antenna. Within the transceiver is provided the Schottky diode which generates on the conductor 55 a wave form having a frequency dependant upon the Doppler shift. The signal on the conductor 55 is amplified in the amplifier 52 and submitted to the comparator 53 which compares the amplitude of the signal with a threshold in the comparator 53. Only if the signals exceed the threshold they are transmitted by the comparator on a conductor 57 to the processor 51 for digital processing.

The processor is programmed to receive the signals from the conductor 57 to filter the signals and to provide an output on the signal line 60 providing a required output to the main controller of the vehicle which is arranged to calculate a vehicle velocity detected by the radar transducer. Thus different vehicle controllers manufactured by different customers have different requirements for the signal to be transmitted. Basically the signal to be transmitted is a wave form at a predetermined frequency with the frequency dependant upon the velocity detected and determined by the processor.

However the frequency may be offset by a predetermined additional frequency. That is, where the velocity is zero, the signal transmitted on the line 60 is at the predetermined frequency. Then as the velocity increases, the signal frequency increases from the predetermined frequency with a predetermined scaling factor. Thus the processor can be arranged to select both the scaling factor and the offset value for the frequency supplied on the signal line 60. Thus, after calculating the actual velocity from the signal on the line 57, the processor can vary the frequency applied to the signal line 60 in accordance with a pre-selected program in the processor 51.

A further factor which can be varied at the signal line 60 is the polarity of the signals applied on the line 60. Thus again different vehicle processors require signals of a different polarity and the program in the processor can be modified to change the polarity as required.

A yet further factor which can be modified in the program with the processor 51 is the processing time which is used to analyze the signal on the line 57 before determining the value of the velocity to be applied for calculation of an output frequency on the signal line 60. Thus it will be appreciated that additional processing within the processor 51 can be used to filter various aspects of the signal by comparison with historical records and other known filtering techniques. Thus the amount of processing time utilized to acquire and filter the signal to provide the best available response significantly increases the response time and thus generates a delay before an output change is indicated. Certain customers therefore require a certain response time and thus short response times require limited acquisition and processing.

A second of the lines indicated at 61 is the radar present line which is generated by the processor to provide an output voltage which is simply indicative of the radar transducer being on. The processor is arranged such that programming is effected of the processor through the signal line.

To program the processor, voltage on the power lead is increased to 28 volts for a short period of time and then lowered to 12 volts. This triggers the programming function. During this time period, the controller monitors the signal line and communicates with a programming computer that uploads the application software into the processor 51. This programming can be repeated to modify the processor 51 for different signal outputs as required by the end user.

As an alternative arrangement, the processor 51 can be programmed to provide communication using a bus communication protocol such as CANBUS or MUXBUS on the lines 60 and 61 thus replacing the simple radar present and signal outputs with an interrogation reply communication protocol system.

As previously described the electrical components did not require metallic shielding to avoid the effects of extraneous EM radiation. In order to achieve this the power supply 50 is arranged such that a five volt regulator powers the analogue section defined by the amplifier 52 and the comparator 53 directly and powers the processor through a pi-RC filter defined by the resistor R and the capacitors C as shown in FIG. 1. No more than 1 resistive element is provided in the power supply conductor to decrease impedance and avoid resident sensitivity. The resistor is indicated at R.

The processor 51 is programmed to filter signals from the extraneous EM waves using various filtering techniques well known to one skilled in the art. Thus the filtering is carried out in the digital processing section rather than in the analogue section as would be conventional.

Top and bottom layers of the four-layer PCB are connected by multiple vias and establish a grounded shielding cage for the power supply layer and circuit conductors of the PCB that are mostly placed in the fourth internal layer. The ground and power layers serve as shielding for internal traces and distributed shunting capacitor with very low inductance. The analogue input circuitry is the most susceptible part of the device and placing a low impedance voltage regulator in close proximity to it improves immunity to EM radiation. The microprocessor itself deals with rail-to-rail signals and tolerates higher noise level on the power/ground lines.

Amplitude modulated RF signals have relatively wide spectrum and are rejected in the processor 51 by software processing in the same manner that is used for filtering random vibration as is well known to one skilled in the art.

The processor 51 is also programmed to carry out a self test of the operation of the microwave transceiver and to provide a failure output signal to the cable in the event that the operation is found to be outside predetermined parameters.

The self-test is programmed to be carried out on power-up of the transducer which is therefore at a time when the vehicle is stationary so that there should be no input to the microwave transceiver from the Doppler signal.

The self-test includes two testing procedures which have been determined to provide an effective indication as to the operation of the microwave transceiver and particularly the Schottky diode. The most vulnerable and sensitive part of the radar is the Schottky diode. It can be damaged by low voltage ESD-discharge or RF-power coupled to ground. Usually it does not die instantly but degrades in time. The early warning of this process is increased noise density. It is difficult to measure noise on the diode directly but after amplification in the circuit it becomes measurable. When the amplified noise at the amplifier output 52 is higher than the comparator threshold, the controller 51 sees pulses on the line 57 at a time when there should be no pulses because the Doppler shift is zero and the processor 51 is programmed to report failure.

Further for proper radar operation in all ambient conditions, noise peaks should be at least three times lower than the threshold voltage. This test is carried out by measuring noise amplitude at the amplifier output using an analogue input of the microcontroller. Thus the second test detects the presence of noise signals having amplitude greater than a predetermined level lower than the threshold and preferably one third of the threshold and to provide failure output signal in response to the failure of this test.

The failure mode is indicated on the radar present line by generating a modulated signal rather than a constant voltage at the radar present lead.

Figure 5:
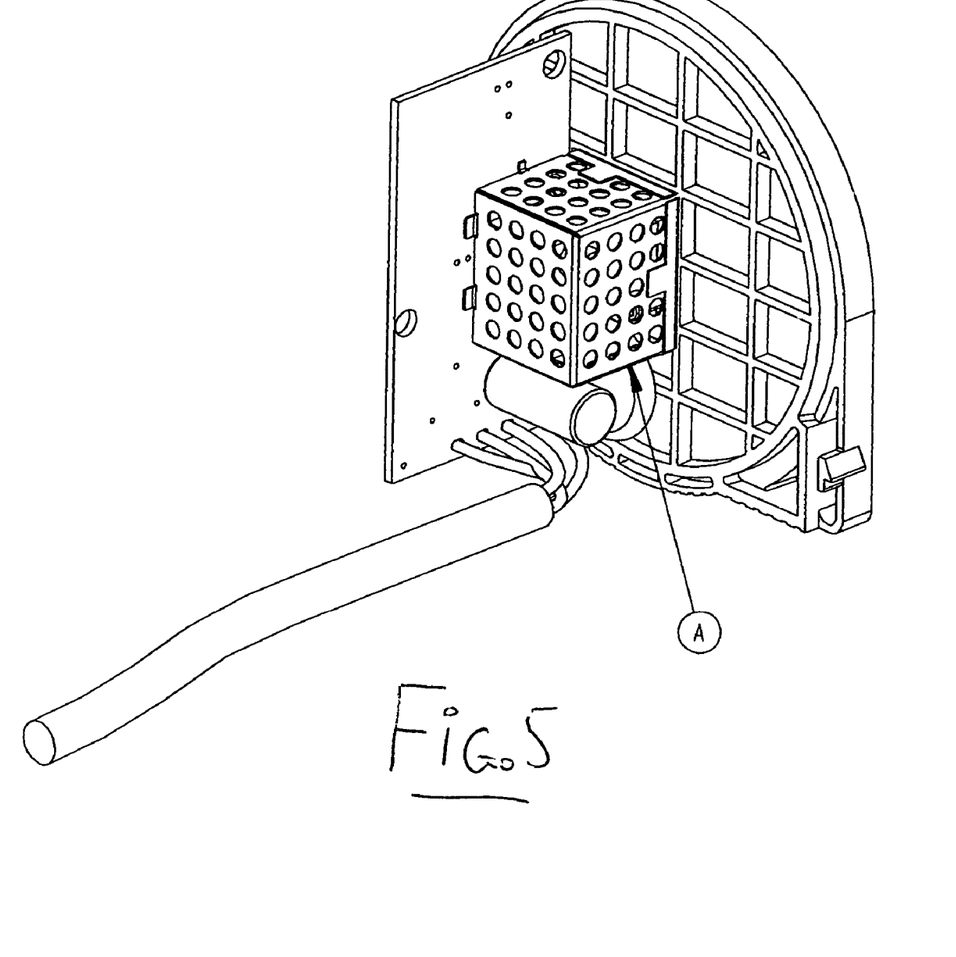
FIG. 5 is an isometric view of the components of FIG. 2 including a mounting assembly for supporting a planar array antenna, a microwave transceiver, an electrical processing section and a cable and further including a shielding for the transceiver, prior to insertion into the housing.
Figure 6:
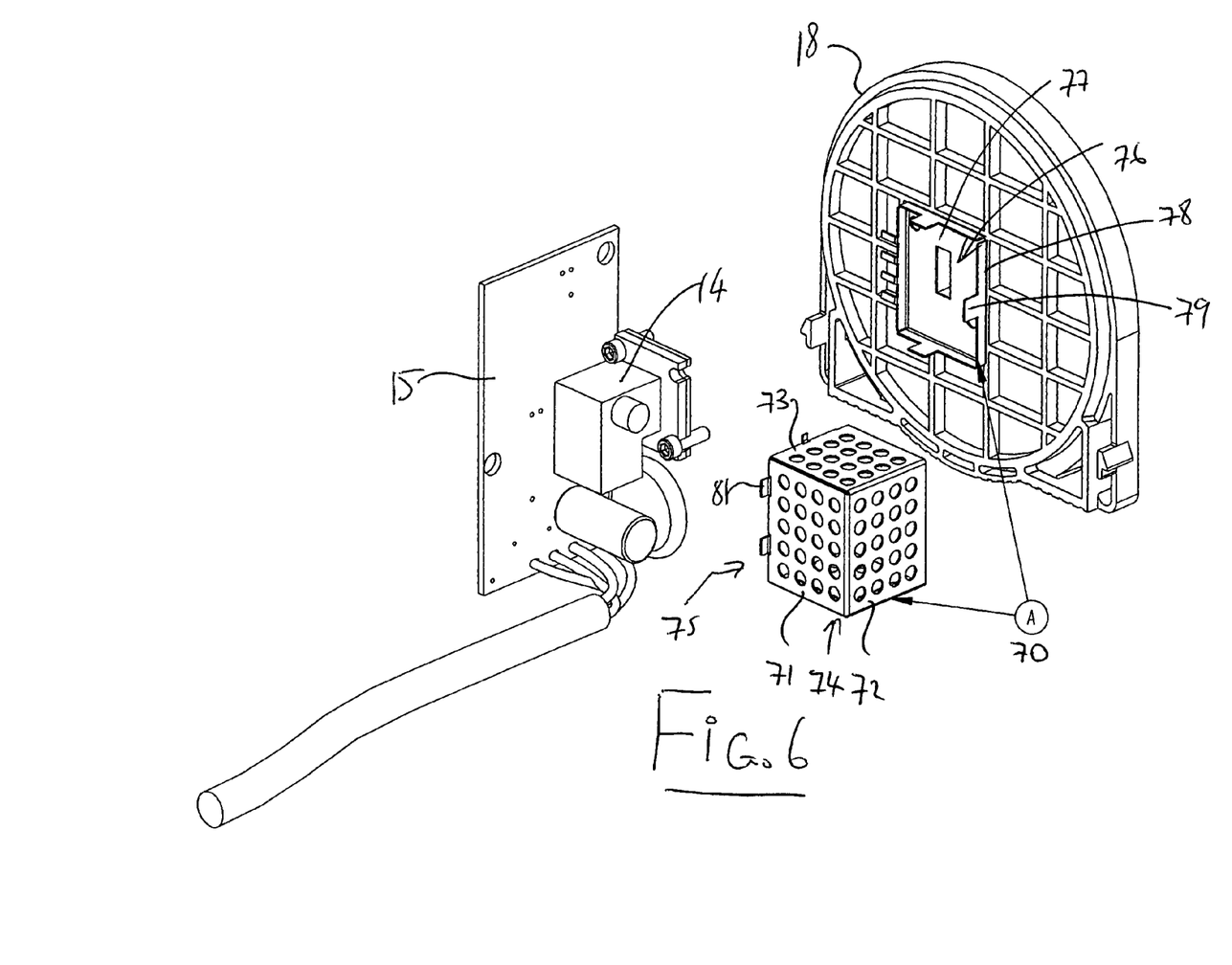
FIG. 6 is an exploded view of the components of FIG. 5.

Turning now to FIGS. 5 and 6 there is shown in the construction described above an additional metallic shield 70 which is applied over the transceiver 14. The remaining components remain free from shielding and use the above described techniques to reduce electromagnetic interference.

Experiments and testing has determined that the transceiver is the root cause of electromagnetic compatibility issues on the radar. The metal cage 70 is applied around the transceiver and not over any other electronic components and allows the transducer to pass harsh customer EMI requirements.

Since, potting is used as a mechanical support for the transceiver body the shield 70 is not formed as a closed box. But instead it is perforated with a perforation size of the exposed sides of the metal box so that the potting compound passes through the holes and encapsulates the transceiver and supports it from vibration and at the same time provide the required EMI protection.

Thus the shield forms a rectangular box of a first part 75 defined by four perforated walls 71, 72, 73 and 74 and a second part 76. The second part 76 includes an imperforate base wall 77 and four upstanding flanges 78 each at a respective side. The base wall 77 is fastened flat against the plate 18 by the screws which fasten the transceiver 14 to the plate. The first part 75 has an open face against the base plate 77 and the sides 73, 74 and 72 engage against three of the flanges 78 at the sides. These three flanges have a fastening tab 79 extending along the side of the first part 75. The first part has a second open face against the circuit board 15 so that the second open face is at right angles to the plate 77 at the first open face. Thus the shield is a fully closed box of generally square shape with two sides closed respectively by the plate 77 and the circuit board 15. The sides 71, 73 and 74 have mounting tabs 81 for attachment to the circuit board. The shield is shaped and dimensioned to just enclose the transceiver. The shield is shaped and dimensioned and arranged relative to the other components on the circuit board so that the other components are not enclosed and thus are open to the electromagnetic waves.

The sides of the first part are perforated by the holes 80 so that the potting material can penetrate and fill the hollow interior for locating and preventing vibration of the transceiver relative to the circuit board and relative to the plate 18.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A radar transducer comprising:
   an antenna for transmitting electromagnetic waves at a predetermined frequency and for receiving reflected waves at a second frequency Doppler shifted from the predetermined frequency;
   a microwave transceiver for supplying to and receiving from the antenna the electromagnetic waves and detecting a Doppler frequency;
   an output cable;
   an electrical processing section mounted on a circuit board for processing the Doppler frequency and for communicating with the output cable;
   and a housing for containing the antenna, the microwave transceiver and the electrical processing section and for receiving and locating an inner end of the output cable;
   wherein the microwave transceiver is shielded by a metallic shield surrounding the microwave transceiver leaving the electrical processing section exposed outside the metallic shield;
   wherein the antenna comprises a substantially planar array;
   wherein the housing comprises a mounting element providing mountings thereon for the antenna, the microwave transceiver, the metallic shield, the electrical processing section and an inner end of the cable,
   the mounting element including a generally plate shaped portion with a front face defining a support for the planar antenna array and a rear face for supporting the microwave transceiver and the metallic shield;
   wherein the housing comprises a receptacle element defining a generally flat radome;
   wherein the receptacle element has an open end face at one end of the radome with the open end face lying in a plane generally at right angles to the radome;
   the mounting element carrying the antenna, the microwave transceiver, the metallic shield, the electrical processing section and an inner end of the cable being inserted as a common assembly through the open end face into the receptacle element so that the generally plate shaped portion lies generally parallel to the radome,
   and a potting compound closing the open end face of the receptacle element and enclosing the mounting element, the antenna, the microwave transceiver, the metallic shield, the electrical processing section and an inner end of the cable within the receptacle element.

2. The transducer according to claim 1 wherein the metallic shield includes at least a portion which has perforations therein and wherein the potting material extends through the perforations into a hollow interior of the metallic shield to locate and support the microwave transceiver from vibration.

3. The transducer according to claim 1 wherein the plate portion has a part of the metallic shield attached thereto forming one side of the metallic shield and wherein a further part of the metallic shield is separate from the plate portion and is attached thereto.

4. The transducer according to claim 1 wherein one open side of the metallic shield is attached to a circuit board carrying the electrical processing section which circuit board extends generally at right angles to the plate portion.

5. The transducer according to claim 1 wherein the plate shaped portion on which the antenna is mounted has a peripheral sealing member engaging a peripheral sealing surface of the radome of the receptacle element so prevent the entry of the potting compound into an area between the plate portion and the radome.

6. The transducer according to claim 1 wherein the microwave transceiver and the electrical processing section are mounted on a rear of the plate portion opposite to the antenna.

7. The transducer according to claim 1 wherein the microwave transceiver and the electrical processing section are arranged to have a high immunity to extraneous electromagnetic waves by arranging the power supply such that a 5V voltage regulator powers the analogue section directly and the processor through a pi-RC filter.

8. The transducer according to claim 1 wherein the microwave transceiver and the electrical processing section are arranged to have a high immunity to extraneous electromagnetic waves by providing a power supply conductor and a ground return conductor as parallel plates on a printed circuit board on which the electrical processing section is mounted.

9. A radar transducer comprising:
   an antenna for transmitting electromagnetic waves at a predetermined frequency and for receiving reflected waves at a second frequency Doppler shifted from the predetermined frequency;
   a microwave transceiver for supplying to and receiving from the antenna the electromagnetic waves and detecting a Doppler frequency;
   an output cable;
   an electrical processing section mounted on a circuit board for processing the Doppler frequency and for communicating with the output cable;
   and a housing for containing the antenna, the microwave transceiver and the electrical processing section and for receiving and locating an inner end of the output cable;
   wherein the microwave transceiver is shielded by a metallic shield surrounding the microwave transceiver;
   wherein the metallic shield includes at least a portion which has perforations therein;
   and wherein the housing contains a potting material which extends through the perforations into a hollow interior of the metallic shield to locate and support the microwave transceiver from vibration.

10. The transducer according to claim 9 wherein the housing comprises a mounting element providing as a common assembly mountings thereon for the antenna, the microwave transceiver, the electrical processing section and an inner end of the cable as a common assembly, a receptacle element having an open end face, into which the mounting element carrying the antenna, the microwave transceiver, the electrical processing section and an inner end of the cable are inserted as a common assembly, and a potting compound closing the open end face and enclosing the mounting element, the antenna, the microwave transceiver, the electrical processing section and an inner end of the cable within the receptacle.

11. The transducer according to claim 10 wherein the mounting element includes a plate portion on which the antenna is mounted as a planar array, wherein the plate portion has a part of the metallic shield attached thereto forming one side of the metallic shield and wherein a further part of the metallic shield is separate from the plate portion and is attached thereto.

12. The transducer according to claim 11 wherein one side of the further part of the metallic shield is defined by the circuit board carrying the electrical processing section which extends at right angles to the plate portion.

13. A radar transducer comprising:

an antenna for transmitting electromagnetic waves at a predetermined frequency and for receiving reflected waves at a second frequency Doppler shifted from the predetermined frequency;

a microwave transceiver for supplying to and receiving from the antenna the electromagnetic waves and detecting a Doppler frequency;

an output cable;

an electrical processing section mounted on a circuit board for processing the Doppler frequency and for communicating with the output cable;

and a housing for containing the antenna, the microwave transceiver and the electrical processing section and for receiving and locating an inner end of the output cable;

wherein the microwave transceiver is shielded by a metallic shield surrounding the microwave transceiver leaving the electrical processing section exposed outside the metallic shield;

wherein the antenna comprises a substantially planar array;

wherein the housing comprises a mounting element including a generally plate shaped portion with a front face defining a support for the planar antenna array and a rear face for supporting the microwave transceiver and the metallic shield;

wherein the housing comprises a receptacle element defining a generally flat radome;

and a potting compound within the receptacle element and enclosing the mounting element;

wherein the plate shaped portion on which the antenna is mounted has a peripheral sealing member engaging a peripheral sealing surface of the radome of the receptacle element to prevent the entry of the potting compound into an area between the plate shaped portion and the radome.

* * * * *